July 3, 1962 R. K. ENGHOLDT 3,042,357
MOTOR OPERATED VALVE
Filed Oct. 13, 1959 2 Sheets-Sheet 1

INVENTOR.
RICHARD K. ENGHOLDT
BY John W. Michael
ATTORNEY

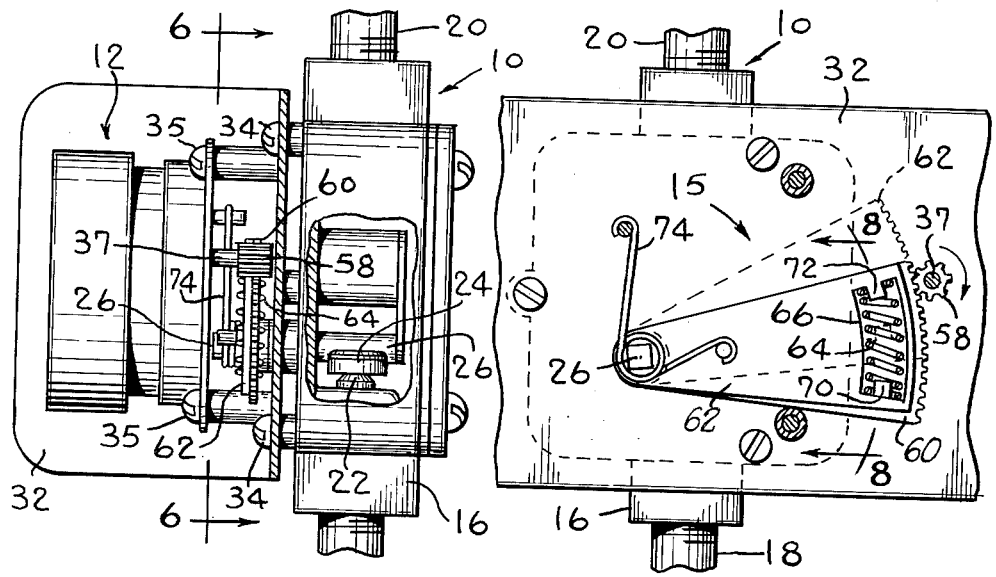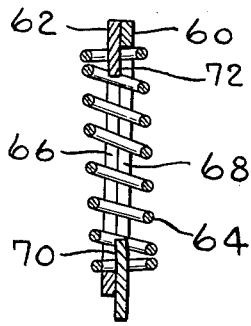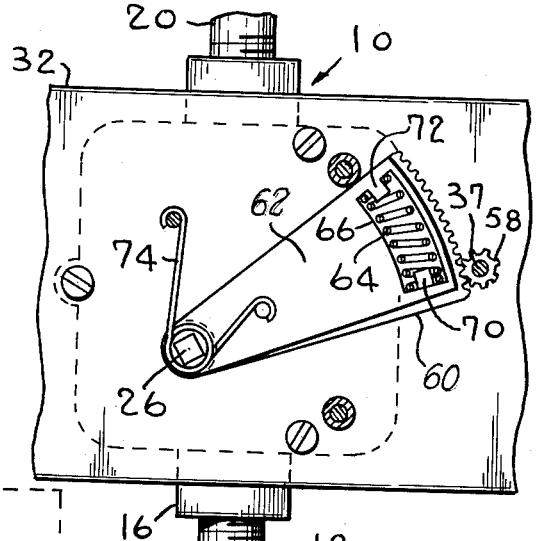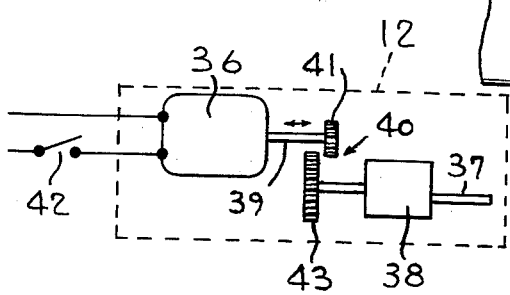

United States Patent Office 3,042,357
Patented July 3, 1962

3,042,357
MOTOR OPERATED VALVE
Richard K. Engholdt, Milwaukee, Wis., assignor to Erie Manufacturing Co., Milwaukee, Wis., a corporation of Wisconsin
Filed Oct. 13, 1959, Ser. No. 846,169
4 Claims. (Cl. 251—78)

This invention relates to motor operated valves and more particularly to relatively small valves of this type adapted to control the operation of a water softening system, for example.

Competition in the manufacture and sale of such equipment is very stiff with the result that the industry is continuously striving to develop ways to reduce the cost and improve the quality of the product.

It is the object of this invention, therefore, to provide a motor operated valve of this type which is inexpensive to manufacture and yet operates smoothly, quietly and reliably.

This object is attained by a motor operated valve having a pivotally mounted valve member adapted to control the flow of liquid through the valve. An actuating mechanism is operatively connected to the valve member and adapted to pivot the member between open and closed positions. A return spring is provided for returning the actuating mechanism to the valve closing position. An electric motor is operatively connected to the actuating mechanism and adapted to drive the mechanism and thereby pivot the valve member from its closed to its open position. The motor is of the type which can be stalled without damage so that no means must be provided to automatically disengage the motor from the valve member when the valve reaches its fully open position. Reduction gearing is provided between the motor and the actuating mechanism so that a motor of relatively small size may be utilized to actuate the valve. To complete the combination, an electromagnetically operated clutch is provided to disengage the motor and at least a portion of the reduction gearing from the actuating mechanism when the motor is deenergized. Thus, the load which the return spring must overcome to close the valve is reduced sufficiently so that the actuating mechanism can be reversed and the valve closed by the bias of a simple return spring.

Two modifications of an actuating mechanism are disclosed. Both include means for absorbing power from the motor upon initial energization thereof and for suddenly releasing the stored energy thereafter to quickly move the valve to its open position. This extra energy quickly available to open the valve improves the valve opening characteristics whereby undesirable noise and wear, otherwise present is eliminated.

Other objects and advantages will be pointed out in, or be apparent from the specification and claims, as will obvious modifications of the two embodiments shown in the drawings, in which:

FIG. 5 is a side elevation with parts broken away showing a second embodiment of my invention;

FIG. 6 is a sectional view taken along line 6—6 of FIG. 5;

FIG. 7 is a view similar to FIG. 6 but showing the parts with the valve in the open position;

FIG. 8 is a sectional view taken along line 8—8 of FIG. 6; and

FIG. 9 is a simplified schematic wiring diagram of the drive motor unit for the valve.

Figures 1, 2:
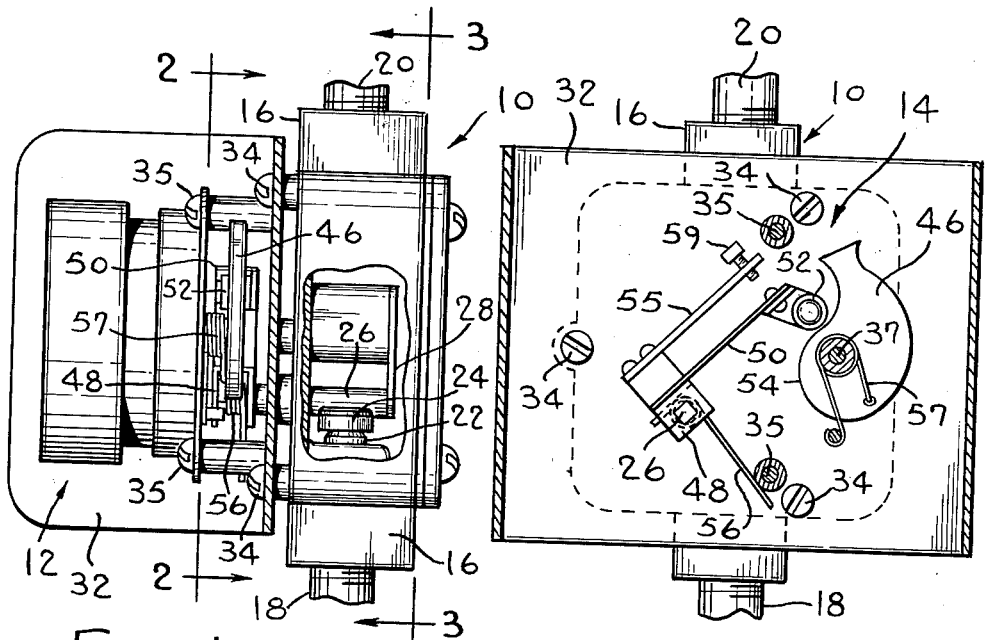
FIG. 1 is a side elevation with parts broken away showing a motor operated valve embodying my invention.
FIG. 2 is a sectional view taken along line 2—2 of FIG. 1.

Referring to the drawings, FIGS. 1–4 show one embodiment of my invention comprising a fluid valve 10 driven by an electric motor unit 12 through an actuating mechanism 14. A second embodiment employing an actuating mechanism 15 of different design is shown in FIGS. 5–8.

Figures 3, 4:
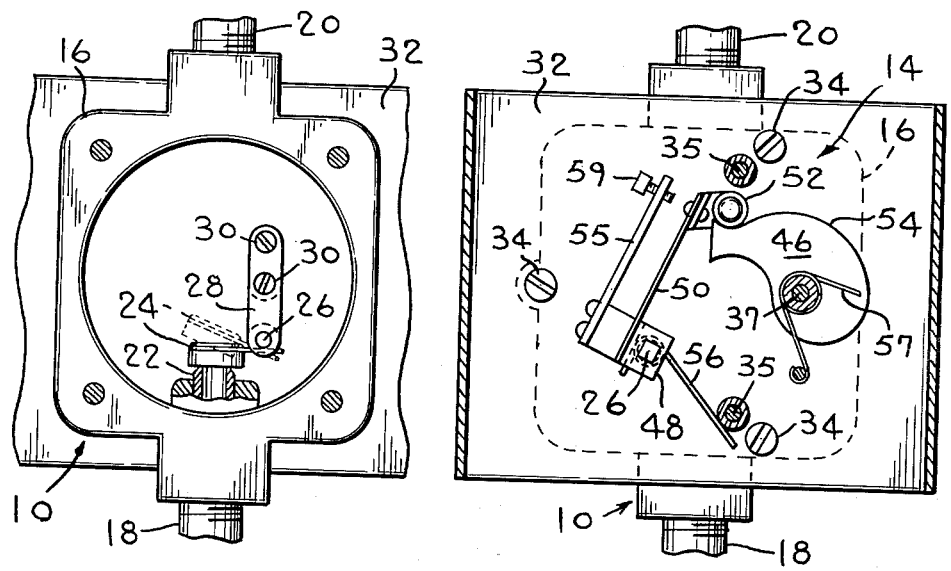
FIG. 3 is a sectional view taken along line 3—3 of FIG. 1.
FIG. 4 is a view similar to FIG. 2 but showing the parts with the valve in the open position.

As shown in FIG. 3, valve 10 includes a casing 16 having an inlet 20 and an outlet 18 with a seat 22 at the outlet which cooperates with a valve member 24 to control flow through the valve. Valve member 24 is mounted for pivotal movement on a shaft 26 journaled at one end in a support member 28 mounted inside casing 16 by machine screws 30. As shown in FIGS. 2, 4, 6 and 7 shaft 26 is square at one end for actuation by mechanisms 14 and 15, the details of which will be described hereinafter.

Motor unit 12 and actuating mechanisms 14 and 15 are mounted on valve casing 16 by a bracket 32 fastened to the casing by machine screws 34 with motor unit 12 mounted on the bracket and spaced from and overlying the actuating mechanisms by screws 35. As shown in FIG. 9, motor unit 12 includes an electric motor 36 which drives a shaft 37 through an electromagnetic clutch 40 and reduction gearing 38. Motor 36 is of a type that can be stalled without damage so that when the motor is energized to open valve 24 by closing the switch 42 it will remain energized when the valve is fully open without damage to the motor windings. Thus, it is unnecessary to provide additional switching to relieve the motor load when the valve is fully open as would be the case if the motor were not the type that could be stalled without damage.

By using a relatively long gear train it is possible to actuate the valve with an inexpensive low torque motor and thereby further reduce the cost of the device. The use of such a motor however creates a problem in closing the valve since it is difficult to reverse the reduction gearing and motor armature by means of a simple return spring. This problem is overcome by providing a normally disengaged electromagnetically operated clutch 40. Clutch 40 may be of any suitable type such as that shown in FIG. 9 wherein the clutch includes an axially slidable motor shaft 39 actuated by the motor windings and having a pinion gear 41 mounted thereon for movement into driving engagement with a mating gear 43 on a shaft 45 when motor 36 is energized. Thus, it is seen that when switch 42 is closed motor 36 is energized and clutch 40 is engaged to drive shaft 37 and thereby open valve 24. As stated above, when valve 24 reaches a fully open position motor 36 will stall and clutch 40 will remain engaged. When switch 42 is opened to deenergize the motor, clutch 40 will disengage to remove the clutch gears 41 and 43 and motor armature load from shaft 37 to thus permit valve 24 to close by means of a simple return spring.

While it is preferred to use a motor with a clutch arrangement of the type described above, it should be understood that the clutch could be omitted if a larger motor with a relatively short gear train was employed. The larger motor would provide sufficient power through a relatively short gear train to actuate the valve and thus permit reversal of the gearing and motor by a simple return spring. Either with or without a clutch the motor should be of the type that can be stalled without damage to provide an arrangement having a minimum of working parts.

As stated above, FIGS. 1–4 show one embodiment of my invention and FIGS. 5–8 show an alternative arrangement. In both embodiments the valve and motor unit structure may be identical, the only difference being in the valve actuating mechanism employed in the two embodiments which, as will now be explained, are specially designed to provide smooth and quiet valve operation.

Referring now to the embodiment shown in FIGS. 1-4, mechanism 14 includes a cam 46 mounted on the end of shaft 37 adapted for rotating valve shaft 26 by means of a bracket 48 mounted on shaft 26 and having a resilient spring arm 50 fastened thereto. Arm 50 has a cam follower 52 mounted on the end thereof and biased into engagement with cam surface 54 on cam 46 by a spring 56. Thus, as cam 46 is rotated clockwise (as viewed in FIGS. 2 and 4), arm 50 will be swung to the left from the position shown in FIG. 2 to that shown in FIG. 4 to thereby open valve 24. A return spring 57 mounted on shaft 37 is provided to return cam 46 to its FIG. 2 position when the motor is deenergized. When this occurs valve 24 will be closed by the action of spring 56.

Experience has shown that when using valves having a 5/16 inch or larger seat size, an unstable condition will often occur upon initial opening of the valve. When such an unstable condition occurs, the rubber valve disc 24 does not leave the seat 22 in one continuous motion but instead as water starts to flow there is a short period during which the valve interrupts the flow several times before lifting free of the seat. Undesirable noise and excessive wear results.

To improve the valve opening characteristics and eliminate this problem, I provide a resilient means for absorbing power from the motor and then releasing the energy stored in such means as the valve is broken away from the seat to thereby cause the valve to travel quickly to an open position. Such resilient means in the FIG. 1-4 embodiment consists of resilient arm 50 which, upon initial rotation of cam 46 to open the valve, will flex slightly to produce the desired characteristics described above. To limit the amount of flexing of arm 50 and thereby provide a positive valve opening force after arm 50 has flexed a given amount, a rigid arm 55 fastened to bracket 48 and extending parallel with arm 50 is provided. The angle through which spring arm 50 can be flexed before a direct drive is established can be adjusted by means of a stop screw 59 threaded in the end of arm 54 as shown.

Referring now to the second embodiment of the invention shown in FIGS. 5-8, actuating mechanism 15 includes a pinion gear 58 mounted on the end of shaft 37 in driving engagement with a spur gear segment 60 freely rotatably mounted on shaft 26. Segment 60 actuates valve 24 by means of a segment 62 fixedly mounted on shaft 26 and a compression spring 64. As shown in detail in FIG. 8, spring 64 is mounted in aligned cut-out portions 66 and 68 in the segments and retained in place by projections 70 and 72 on segments 60 and 62, respectively. Thus, as spur gear segment 60 is driven by pinion 58, segment 62 will be rotated by spring 64 to open the valve. In this embodiment spring 64 serves to absorb power from the motor to provide a sudden release of energy for quickly opening the valve without undesirable noise and wear. A single return spring 74 mounted on shaft 26 is provided to return both the valve 24 and the segments 60 and 62 to the position shown in FIG. 6.

Although two embodiments of the present invention have been illustrated and described, it will be apparent to those skilled in the art that various changes and modifications may be made therein without departing from the spirit of the invention or from the scope of the appended claims.

I claim:

1. A motor operated valve having a pivotally mounted valve member adapted to control the flow of fluid through the valve comprising, an actuating mechanism operatively connected to the valve member adapted to pivot said member between open and closed positions, return spring means for said actuating mechanism adapted to bias said mechanism to its valve closing position, a motor operatively connected to said actuating mechanism and adapted to drive said mechanism and thereby pivot the valve member from its closed to its open position, said motor being of the type which can be stalled without damage thereto so that no means must be provided to automatically disengage said motor from the valve member when the member reaches its fully open position, reducing gear means between said motor and said actuating mechanism, and electromagnetically operated clutch means for said motor, said clutch means being actuated by the windings of said motor and adapted to disengage said motor and at least part of said reducing gear means from said actuating mechanism when said motor is deenergized to thereby reduce the drag which said return spring means must overcome when acting to return said actuating means to its valve closing position.

2. Actuating mechanism for a pivotally mounted valve member adapted to control flow through a valve comprising, a first pivotally mounted spur gear member, motor means for driving said first spur gear member, a second pivotally mounted member operatively connected to the valve member, and spring means mounted between said first spur gear member and said second member to provide a resilient driving connection between the two members whereby pivotal movement of said first spur gear member will exert a force on said second member through said spring tending to pivot said second member in the valve opening direction.

3. Actuating mechanism according to claim 2 in which said spring means providing the resilient driving connection between said first spur gear member and said second member is a compression spring mounted in aligned cut-out portions in said members and retained by opposing projections on said members extending into opposite ends of said compression spring.

4. Actuating mechanism according to claim 3 in which said first spur gear member and said second member are mounted for pivotal movement about a common axis.

References Cited in the file of this patent

UNITED STATES PATENTS

| | | |
|---|---|---|
| 2,503,563 | Ray | Apr. 11, 1950 |
| 2,738,033 | Towle | Mar. 13, 1956 |
| 2,789,784 | Cobb | Apr. 23, 1957 |
| 2,844,768 | Hilgert | July 22, 1958 |
| 2,850,258 | Lazich | Sept. 2, 1958 |
| 2,862,684 | Ander | Dec. 2, 1958 |
| 2,930,249 | London | Mar. 29, 1960 |